Figure 1:
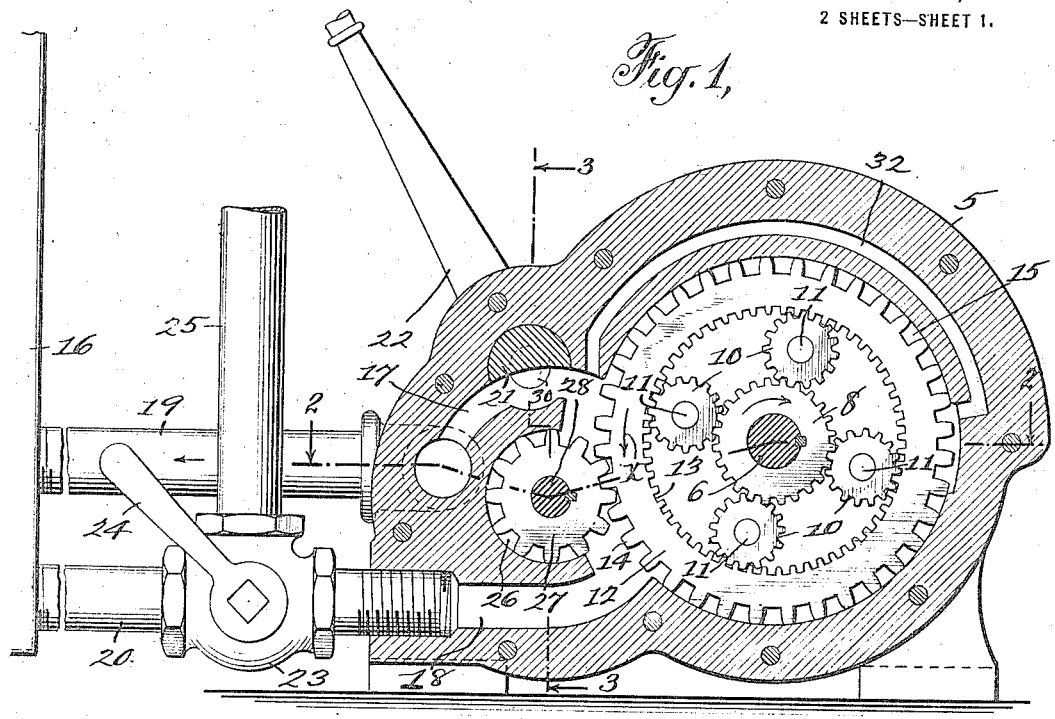

E. A. MINOR.
TRANSMISSION MECHANISM.
APPLICATION FILED OCT. 2, 1914.

1,161,066.

Patented Nov. 23, 1915.
2 SHEETS—SHEET 1.

WITNESSES
L. Hauerstein
J. C. Larsen

INVENTOR
Edward A. Minor
BY Wynn & Co.
ATTORNEYS

E. A. MINOR.
TRANSMISSION MECHANISM.
APPLICATION FILED OCT. 2, 1914.

1,161,066.

Patented Nov. 23, 1915.
2 SHEETS—SHEET 2.

WITNESSES
L. Hauerstein
J. C. Larsen

INVENTOR
Edward A. Minor
BY Munn & Co
ATTORNEYS

UNITED STATES PATENT OFFICE.

EDWARD ALEXANDER MINOR, OF WILDER, VERMONT.

TRANSMISSION MECHANISM.

1,161,066.  Specification of Letters Patent. Patented Nov. 23, 1915.

Application filed October 2, 1914. Serial No. 864,610.

*To all whom it may concern:*

Be it known that I, EDWARD A. MINOR, a citizen of the United States, and a resident of Wilder, in the county of Windsor and State of Vermont, have invented certain new and useful Improvements in Transmission Mechanism, of which the following is a specification.

My invention relates to power transmission mechanism; and the main object thereof is to provide means whereby the speed of transmission may be made variable in desired degrees of the driven element with respect to a constantly operated driving element.

A further object is to accomplish this result through what is technically known as a planetary gear and a pump gear operating as a variable brake therefor.

A further object is to provide external means for varying the effect of said pump gear.

A further object is to provide means for locking said pump gear against operation, whereby the transmission of power from one element to the other is correspondingly effected.

My invention is fully described in the following specification, of which the accompanying drawings form a part, in which the separate parts are designated by the same reference characters in each of the views, and in which:—

Figure 2:
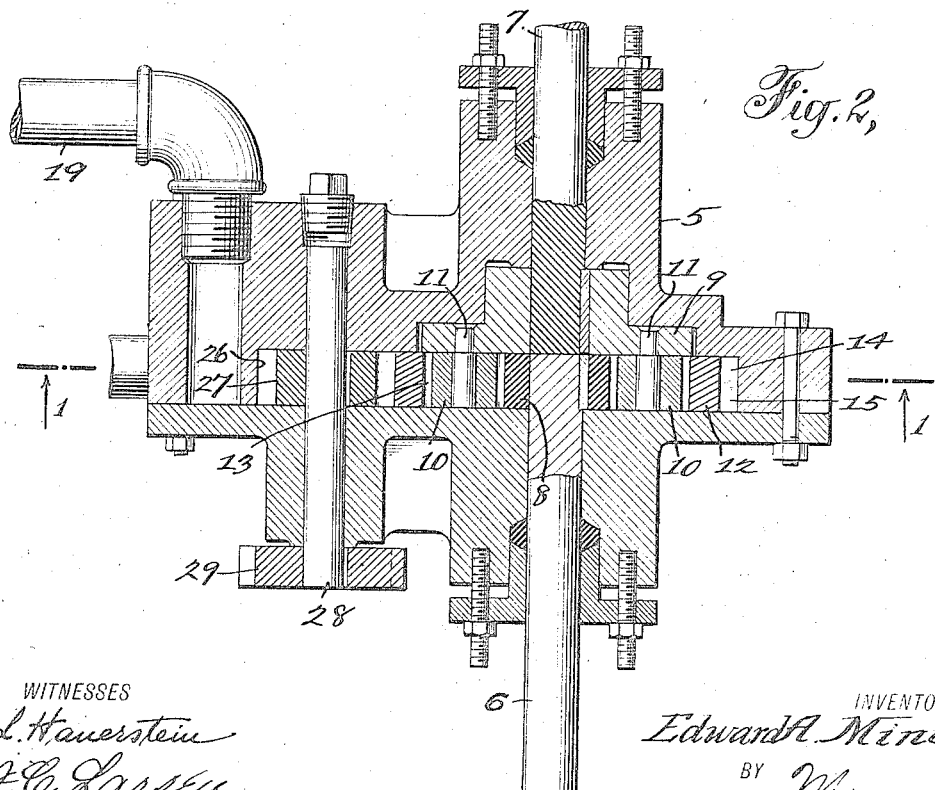
Figure 3:
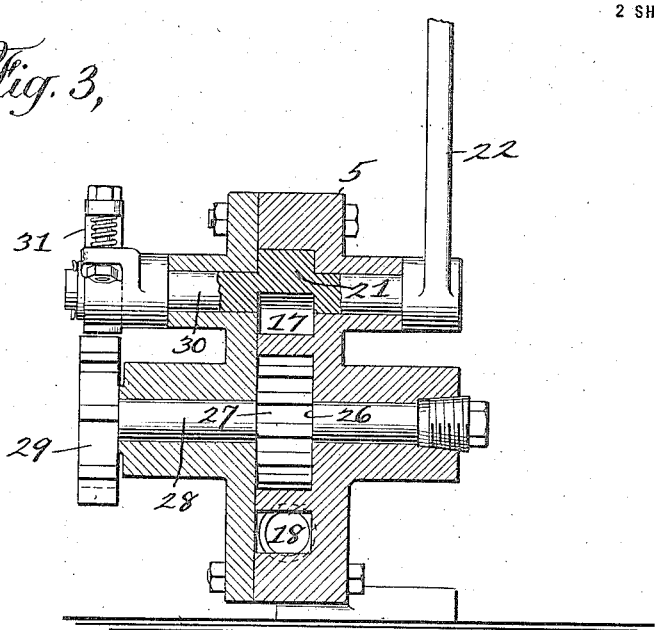
Figure 4:
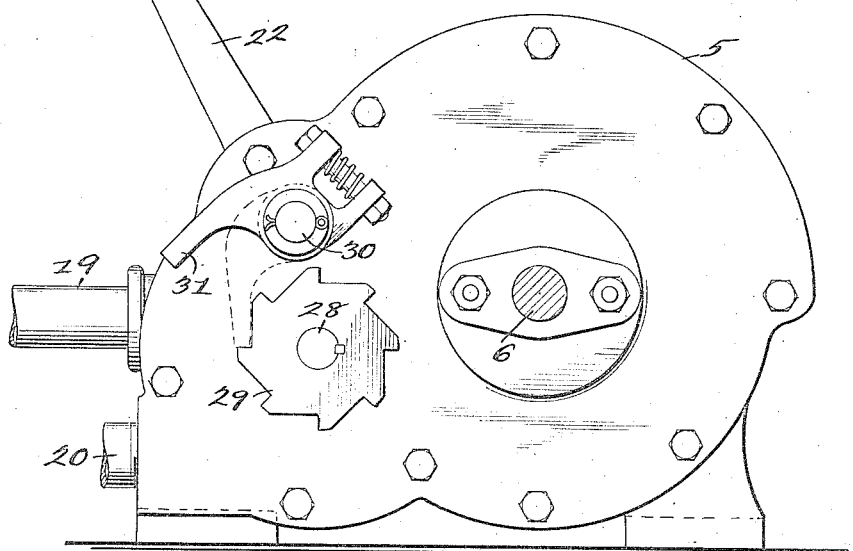

Figure 1 is a longitudinal, vertical, section taken through a variable clutch constructed in accordance with my present invention, on the line 1—1 of Fig. 2; Fig. 2 is a plan section taken on the line 2—2 of Fig. 1; Fig. 3 is a section taken on the line 3—3 of Fig. 1; and Fig. 4 is an outside elevation thereof.

In the drawings forming a part of this application I have shown a present preferred form of embodiment of my invention comprising a casing 5 having two shafts 6 and 7 rotatable therein and arranged in the same axis, the former having a spur gear 8 keyed thereto within said casing, and the latter having a disk 9 keyed thereto and bearing upon the adjacent surface of the gear 8, and said disk carries a plurality of spur pinions 10 upon shafts 11, which pinions are enmeshed with the gear 8. Arranged around the said pinions is an annular member 12 having an internal gear 13 enmeshed with said pinions and an external gear 14 which is in close contact with the interior walls of a chamber 15 in said casing, said chamber being in communication with an oil tank or reservoir 16 by means of two passages 17 and 18 and pipes 19 and 20; the passage 17 is controlled by a rotary valve 21 exteriorly operable by means of a lever 22, and the pipe 20 is controlled by a valve, not shown, within a casing 23 and operable by means of a lever 24, this valve casing also having a relief pipe 25 connected therewith.

The casing 5 contains a segmental chamber 26, between the passages 17 and 18, and within which is a spur pinion 27 upon a shaft 28 which carries a ratchet 29 on its end exterior of said casing, and the teeth of said pinion 27 closely engage the walls of said chamber 26 and are enmeshed with the teeth of the external gear 14, whereby complemental operation results.

Arranged upon the shaft 30 of the rotary valve 21 is a pawl 31 which is adapted to be moved against the ratchet 29 and thereby prevent the revolution of said ratchet and, thus, of the gear member 12, through the medium of the pinion 27, said pawl being so set, with respect to the shaft 30, as not to contact with said ratchet until the rotary valve 21 has been entirely actuated in its closing movement.

When the rotary valve 21 is open, as shown, power applied to the driving shaft 6 revolves the gear 8, and pinions 10 and, if the gear member 12 is free to revolve, the driven shaft 7 is not affected, but remains stationary in view of the revolution of said member 12 in the direction of the arrow X, this free revolution of said member being due to the freedom of movement or flow of the fluid through the passage 18, chamber 15, and passage 17, from and to the tank or reservoir 16. Should, however, the rotary valve 21 be partially closed, this flow of the fluid is correspondingly affected, with a consequent retardation of the revolution of the gear member 12, and the pinions 10 begin an epicyclic movement, carrying the disk 9 therewith and, accordingly, the driven shaft 7, the speed of this epicyclic movement being in the degree of retardation of the gear member 12 which is controlled by the degree of closure of the rotary valve 21 and, when said valve is fully closed, the gear member 12 revolves only at the rate of speed permitted by the relatively negligible amount of fluid passing between the external gear 14 thereof and the pinion 27; if it is desired to positively stop the gear member 12, all that is necessary is to continue the closure movement of the lever 22 until the pawl 31 is engaged with the ratchet 29, and the shaft 7 is then being driven at its maximum speed.

In Fig. 1 I have illustrated a by-pass 32 around a portion of the chamber 15, and the object of which is to eliminate excess wear, due to all the pressure of the resistance of the flow of the fluid, on one side of the gear member 12, but it will be noted that the fluid passing through said by-pass enters the passage 17 at a point between the gear member 12 and the rotary valve 21.

It will thus be seen that I provide a planetary gear for transmitting motion from one shaft to another, and that I also provide a variable brake for the outer element of said planetary gear, whereby the speed of the transmitted motion is under control, said brake being a gear pump having one of its passages adapted to be closed or opened in any degree in order to increase or decrease the speed of transmitted motion.

While I have shown certain details of construction, I do not limit myself thereto, but may make changes thereover, within the scope of the following claim, without departing from the spirit of my invention, or sacrificing its advantages.

Having fully described my invention, what I claim as new, and desire to secure by Letters Patent, is:—

A device of the class described, comprising a casing, having a fluid therein, a driven shaft, a driving shaft, a gear on one shaft, a plurality of pinions enmeshed with said gear on the other shaft, a gear member provided with an internal gear enmeshed with said pinions, and with an external gear, a pinion enmeshed with said external gear, said casing having a fluid passage around said gear member, and a passage on each side of said last named pinion, and a valve in one of said passages for controlling the flow of fluid to correspondingly control the speed of revolution of said gear member and, thereby, of said driven shaft.

In testimony whereof I have signed my name to this specification in the presence of two subscribing witnesses.

EDWARD ALEXANDER MINOR.

Witnesses:
 SAM'L E. PINGREE,
 JESSIE G. TURNER.